(12) United States Patent
Choi et al.

(10) Patent No.: US 10,566,616 B2
(45) Date of Patent: *Feb. 18, 2020

(54) NEGATIVE ACTIVE MATERIAL FOR SECONDARY BATTERY AND SECONDARY BATTERY USING THE SAME

(71) Applicant: ILJIN ELECTRIC CO., LTD., Hwaseong (KR)

(72) Inventors: Young Pil Choi, Ansan (KR); Cheol Ho Park, Suwon (KR); Min Hyun Kim, Seoul (KR); Myeong Han Kim, Ansan (KR); Seon Kyong Kim, Seoul (KR)

(73) Assignee: ILJIN ELECTRIC CO., LTD., Hwaseong (KR)

( * ) Notice: Subject to any disclaimer, the term of this patent is extended or adjusted under 35 U.S.C. 154(b) by 36 days.

This patent is subject to a terminal disclaimer.

(21) Appl. No.: 15/527,351

(22) PCT Filed: Dec. 1, 2015

(86) PCT No.: PCT/KR2015/012993
§ 371 (c)(1),
(2) Date: May 17, 2017

(87) PCT Pub. No.: WO2016/111468
PCT Pub. Date: Jul. 14, 2016

(65) Prior Publication Data
US 2017/0331105 A1 Nov. 16, 2017

(30) Foreign Application Priority Data

Jan. 7, 2015 (KR) .......................... 10-2015-0001838

(51) Int. Cl.
*H01M 10/0525* (2010.01)
*H01M 4/38* (2006.01)
(Continued)

(52) U.S. Cl.
CPC ......... *H01M 4/386* (2013.01); *H01M 10/052* (2013.01); *H01M 10/0525* (2013.01); *H01M 2004/021* (2013.01); *H01M 2004/027* (2013.01)

(58) Field of Classification Search
CPC .......................... H01M 4/386; H01M 10/0525
See application file for complete search history.

(56) References Cited

U.S. PATENT DOCUMENTS 9,722,243 B2 * 8/2017 Park ...................... H01M 4/386
2006/0040182 A1 * 2/2006 Kawakami .......... H01M 10/052
429/218.1

(Continued)

FOREIGN PATENT DOCUMENTS

| CN | 101322266 A | 12/2008 |
| CN | 107004845 A | 8/2017 |

(Continued)

*Primary Examiner* — James Lee
(74) *Attorney, Agent, or Firm* — Patent Office of Dr. Chung Park

(57) ABSTRACT

Disclosed is a negative active material having a reduced volume change during charge/discharge. A fine crystalline region exists on a matrix of an alloy, and lithium is easily dispersed due to the fine crystalline region. In the negative active material, a ratio of the fine crystalline region is represented by an amorphization degree, and is optimized in designing a battery through a measurement of an expansion rate after 50 cycles. The negative active material is used for a secondary battery and includes an alloy formed by a chemical formula below: (a ratio of Ti to Fe is 1:1 and a ratio of Si:Ti or Si:Fe has a range of 5:1 to 9:1.)

$$Si_{1-x}Ti_yFe_zAl_u$$

where x, y, z, and u are at %, x: 1−(y+z+u), y: 0.09 to 0.14, z: 0.09 to 0.14, and u: larger than 0.01 and less than 0.2.

6 Claims, 3 Drawing Sheets

(51) Int. Cl.
*H01M 10/052* (2010.01)
*H01M 4/02* (2006.01)

(56) References Cited

U.S. PATENT DOCUMENTS

| | | | | |
|---|---|---|---|---|
| 2013/0122368 A1* | 5/2013 | Shinya | ................. | H01M 4/386 |
| | | | | 429/218.1 |
| 2015/0140359 A1* | 5/2015 | Park | .................... | H01M 4/0471 |
| | | | | 429/5 |
| 2016/0013484 A1* | 1/2016 | Seki | ...................... | H01M 4/364 |
| | | | | 429/231.8 |
| 2016/0149213 A1 | 5/2016 | Park et al. | | |

FOREIGN PATENT DOCUMENTS

| | | | |
|---|---|---|---|
| JP | 2014-053132 A | 3/2014 | |
| JP | 5621753 B2 | 11/2014 | |
| KR | 10-2004-0063802 A | 7/2004 | |
| KR | 10-2004-0082876 A | 9/2004 | |
| KR | 10-2008-0031323 A | 4/2008 | |
| KR | 10-2014-0080580 A | 7/2014 | |
| KR | 10-2014-0116013 A | 10/2014 | |
| WO | 2007064531 A1 | 6/2007 | |

\* cited by examiner

[Figure 1A]
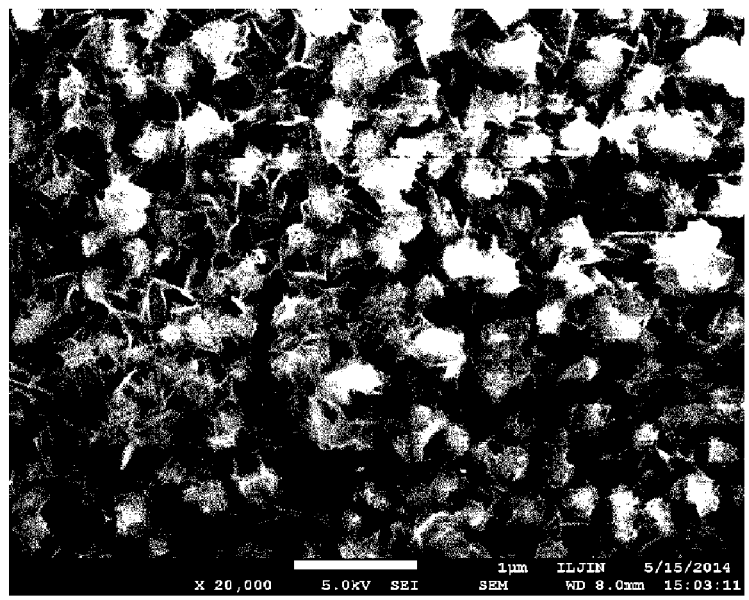
[Figure 1B]
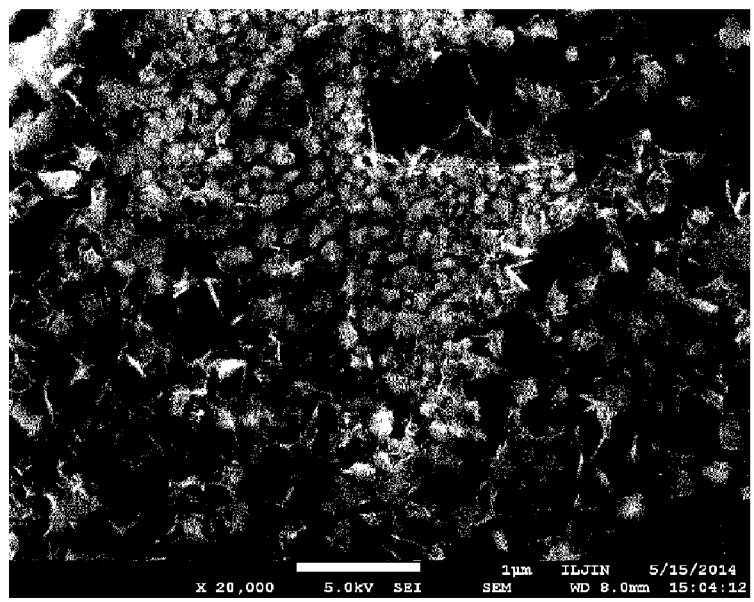

【Figure 1C】
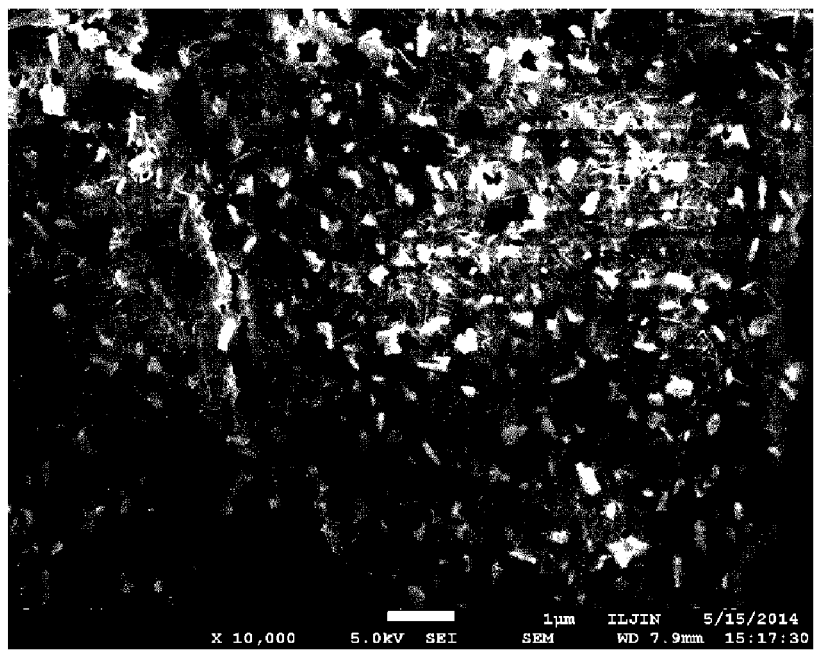
【Figure 2】
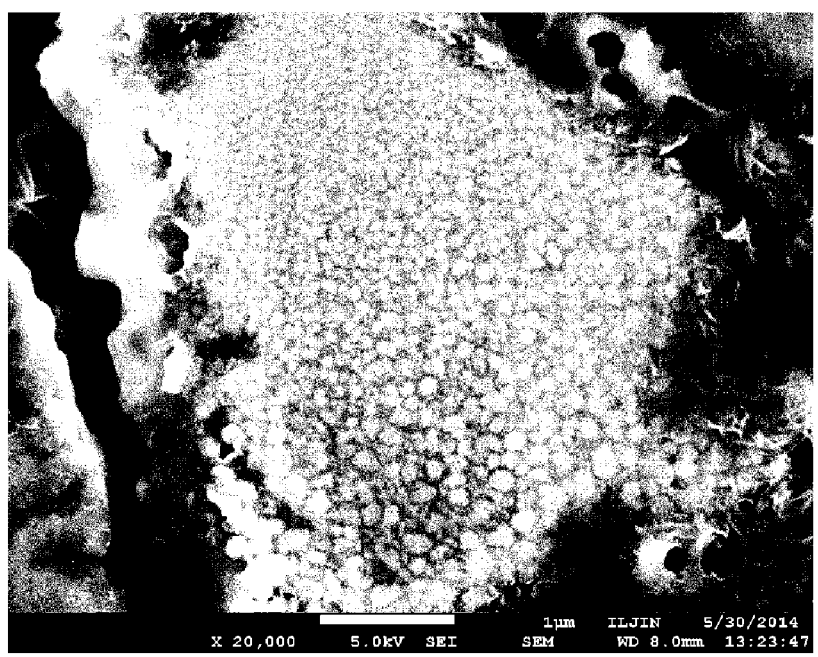

[Figure 3A]
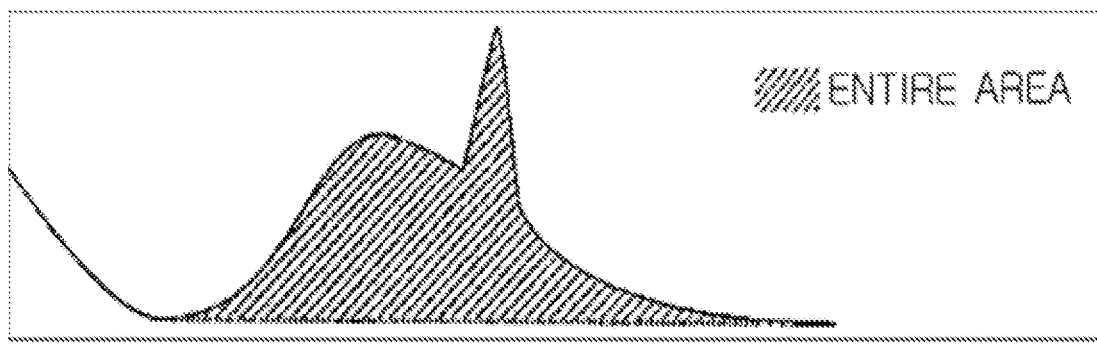
[Figure 3B]
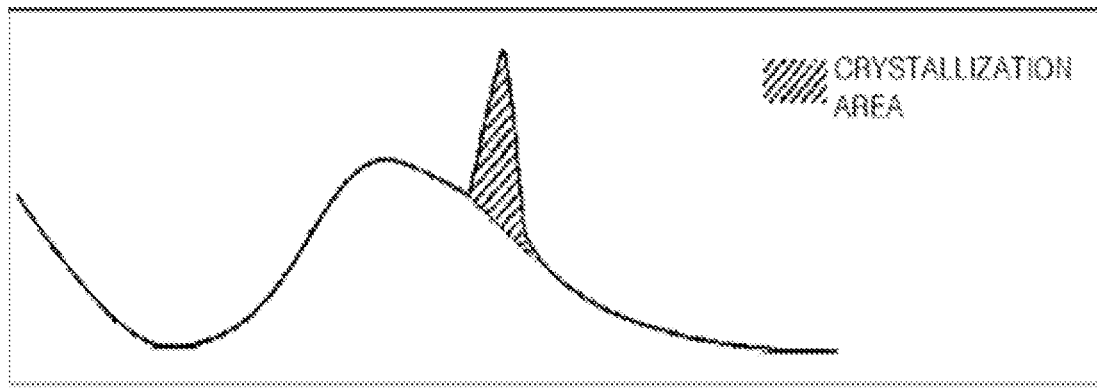

NEGATIVE ACTIVE MATERIAL FOR SECONDARY BATTERY AND SECONDARY BATTERY USING THE SAME

CROSS REFERENCE TO PRIOR APPLICATIONS

This application is a nation stage application of a PCT international application No. PCT/KR2015/012993, filed on Dec. 1, 2015, which claims priority to and the benefit of Korean Patent Application No. 10-2015-0001838 filed in the Korean Intellectual Property Office on Jan. 7, 2015, the entire contents of which are incorporated herein by reference.

TECHNICAL FIELD

The present invention relates to a negative active material for a secondary battery and a second battery using the same.

BACKGROUND ART

A lithium battery in the related art uses a lithium metal as a negative active material, but when a lithium metal is used, a battery is short-circuited by formation of dendrite to cause danger of explosion, so that a carbon-based material is widely used as a negative active material, instead of a lithium metal.

The carbon-based active material includes crystalline carbon, such as graphite and synthetic graphite, and amorphous carbon, such as soft carbon and hard carbon. However, the amorphous carbon has a large capacity, but has a problem in large irreversibility during a charge/discharge process. Graphite is representatively used as the crystalline carbon, and has a theoretical limit capacity of 372 mAh/g, and may be used as a negative active material.

However, even though a theoretical capacity of the graphite or the carbon-based active material is slightly large, the theoretical capacity is simply about 380 mAh/g, so that there is a problem in that the aforementioned negative electrode cannot be used when a large capacity lithium battery is future developed.

In order to solve the problem, research on a metal-based or intermetallic compound-based negative active material has been currently and actively conducted. For example, research on a lithium battery utilizing metal, such as aluminum, germanium, silicon, tin, zinc, and lead, or semimetal as a negative active material has been conducted. The material has a large capacity and a high energy density, and is capable of occluding and discharging larger lithium ions than the negative active material using the carbon-based material, so that it is possible to manufacture a battery having a large capacity and a high energy density. For example, it is known that pure silicon has a large theoretical capacity of 4,017 mAh/g.

However, compared to the carbon-based material, the metal-based or intermetallic compound-based negative active material has a cycle characteristic degradation to be obstacles to commercialization. The reason is that when the silicon is used as a negative active material for occluding and discharging lithium as it is, conductivity between active materials may deteriorate due to a change in a volume during a charge/discharge process, or a negative active material is peeled from a negative current collector. That is, the silicon included in the negative active material occludes lithium by charging and is expanded to have a volume of about 300 to 400%, and when lithium is discharged during the discharge, mineral particles are contracted.

When the aforementioned charge/discharge cycle is repeated, electric insulation may be incurred due to a crack of the negative active material, so that a lifespan of the lithium battery is sharply decreased. Accordingly, the aforementioned metal-based negative active material has a problem to be used in the lithium battery.

In order to solve the aforementioned problem, research on a negative active material having a buffering effect against a volume change by using particles having a nano size level as silicon particles or giving porosity to silicon is conducted.

Korean Patent Application Laid-Open No. 2004-0063802 relates to "Negative Active Material for Lithium Secondary Battery, Method of Manufacturing the Same, and Lithium Secondary Battery", and adopts a method of alloying silicon and another metal, such as nickel, and then eluting the metal, and Korean Patent Application Laid-Open No. 2004-0082876 relates to "Method of Manufacturing Porous Silicon and Nano-size Silicon Particle, and Application of Porous Silicon and Nano-size Silicon Particle as Negative Electrode Material for Lithium Secondary Battery", and discloses technology of mixing alkali metal or alkali earth metal in a powder state with silicon precursor, such as silicon dioxide, performing heat treatment on a mixture, and eluting the mixture as acid.

The patent applications may improve an initial capacity maintenance rate by a buffering effect according to a porous structure, but simply use porous silicon particles having conductivity deterioration, so that when the particles do not have a nano size, conductivity between the particles is degraded while manufacturing an electrode, thereby causing a problem of deterioration of initial efficiency or a capacity maintenance characteristic.

DISCLOSURE

Technical Problem

The present invention has been made in an effort to provide a negative active material for a lithium secondary battery, of which a change in a volume is small during charge/discharge, so that electric insulation is less incurred.

The present invention has also been made in an effort to provide a negative active material for a lithium secondary battery having excellent initial efficiency and an excellent capacity maintenance characteristic.

The present invention has also been made in an effort to provide an optimized negative active material in consideration of an amorphization degree when designing a battery.

Technical Solution

An exemplary embodiment of the present invention provides a negative active material for a secondary battery, which is an alloy formed by a chemical formula below, and in which a ratio of Ti to Fe in the negative active material for the secondary battery has 1:1 and a ratio of Si:Ti or Si:Fe in the negative active material for the secondary battery has a range of 5:1 to 9:1.

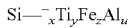

$$Si_{1-x}Ti_yFe_zAl_u$$

(x, y, z, and u are at %, x: 1−(y+z+u), y: 0.09 to 0.14, z: 0.09 to 0.14, and u: larger than 0.01 and less than 0.2)

An amorphization degree of a fine crystalline region on a matrix within the alloy may be 25% or more and an expansion rate of the negative active material after 50 cycles may have a range of 70 to 150%.

Al in the negative active material for the secondary battery may have a range of 5 to 19% based on atom (%) (at %).

Al in the negative active material for the secondary battery may have a range of 10 to 19% based on at (%).

Each of Ti and Fe in the negative active material for the secondary battery may have a range of 9 to 12.5% based on at (%).

A discharge capacity of the negative active material for the secondary battery after 50 cycles may be 90% or more compared to an initial discharge capacity.

Efficiency of the negative active material for the secondary battery after 50 cycles may be 98% or more.

Another exemplary embodiment of the present invention provides a secondary battery, including: a negative electrode including a negative active material, a positive electrode; and an electrolyte, and the negative active material is an alloy formed by a chemical formula below, and a ratio of Ti to Fe in the negative active material for the secondary battery has 1:1, and a ratio of Si:Ti or Si:Fe in the negative active material for the secondary battery has a range of 5:1 to 9:1, and Si has a range of 60 to 70%, Ti has a range of 9 to 14%, Fe has a range of 9 to 14%, and Al has a range of 5 to 19% based on at (%).

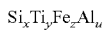   Chemical Formula:

(x, y, z, and u are at %, x: 1−(y+z+u), y: 0.09 to 0.14, z: 0.09 to 0.14, and u: 0.05 to 0.19)

Advantageous Effects

According to the present invention, it is possible to obtain the negative active material for a lithium secondary battery, which has a small change in a volume during charge/discharge, so that electric insulation is less incurred, and has excellent initial efficiency and an excellent capacity maintenance characteristic.

Further, the present invention may provide a value of an amorphization degree of the optimized negative active material in designing a battery through a measurement of an expansion rate after 50 cycles.

Further, the present invention may provide the optimized negative active material in consideration of an amorphization degree when designing a battery.

DESCRIPTION OF DRAWINGS

FIGS. 1A, 1B, and 1C are tissue pictures of an expansion characteristic measured after 50 cycles for a negative active material according to the Comparative Examples.

FIG. 2 is a tissue picture of an expansion characteristic measured after 50 cycles for a negative active material according to the Examples of the present invention.

FIGS. 3A and 3B are diagrams illustrating measurement of an amorphization degree of the negative active material according to the Examples of the present invention.

BEST MODE

An exemplary embodiment of the present invention provides a negative active material for a secondary battery, which is an alloy formed by a chemical formula below, and in which a ratio of Ti to Fe in the negative active material for the secondary battery has 1:1 and a ratio of Si:Ti or Si:Fe in the negative active material for the secondary battery has a range of 5:1 to 9:1.

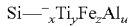

(x, y, z, and u are at %, x: 1−(y+z+u), y: 0.09 to 0.14, z: 0.09 to 0.14, and u: larger than 0.01 and less than 0.2)

MODE FOR INVENTION

Other detailed matters of the exemplary embodiments are included in the detailed description and the drawings.

Various advantages and features of the present disclosure and methods accomplishing thereof will become apparent from the following detailed description of exemplary embodiments with reference to the accompanying drawings. However, the present invention is not limited by the exemplary embodiments disclosed below, but may be implemented in various forms. Throughout this specification and the claims that follow, when it is described that an element is "coupled" to another element, the element may be "directly coupled" to the other element or "electrically coupled" to the other element through a third element. Further, an irrelevant part to the present invention is omitted to clarify the description of the present invention, and like reference numerals designate like elements throughout the specification.

Hereinafter, the present invention will be described in detail with reference to the accompanying drawings.

An exemplary embodiment of the present invention provides a negative active material for a secondary battery with an improved expansion rate, and a secondary battery including the same. Particularly, in the exemplary embodiment of the present invention, it is possible to obtain a negative active material for a secondary battery, in which an amorphization degree of a fine crystalline region on a matrix within an alloy is 25% or more, in the negative active material.

In general, when a silicon-based negative active material is studied, it is measured how much an electrode plate thickness during a full charge at the first cycle after a formation process is increased compared to an initial electrode plate thickness (an electrode plate thickness before an electrolyte is injected). That is, an expansion rate after one cycle is measured, and here, a change in volume of the negative active material is exhibited while the negative active material occludes lithium.

However, in the exemplary embodiment of the present invention, an expansion rate after 50 cycles was measured by measuring a thickness of an electrode plate after repeat of charge and discharge for 50 cycles, not one cycle, and comparing the measured thickness and an initial electrode plate thickness. Through the measurement of the expansion rate after 50 cycles, it is possible to monitor a change in volume according to occlusion and discharge of lithium and a generation degree of a Solid Electrolyte Interface or Interphase (SEI) layer which is piled while an electrolyte is decomposed by a side reaction generated on a surface of an active material.

When a characteristic of a silicon-based negative active material is evaluated by fabricating a coin half cell, a lithium metal electrode used as a counter electrode generally begins to deteriorate after 50 cycles, thereby influencing a result. Accordingly, in the exemplary embodiment of the present invention, a change in a thickness of an electrode plate is measured by deconstructing a coin cell after the evaluation of a lifespan for 50 cycles, so that not only expansion of an initial electrode plate by simple lithium occlusion but also expansion of an electrode plate according to growth of a side reaction layer for subsequent 50 cycles are taken as indexes of an evaluation of performance of a negative active material. Accordingly, in the exemplary embodiment of the present invention, it was found that a change in an expansion rate after 50 cycles is a considerably meaningful evaluation index, and thus it was possible to derive an optimum component range.

Commonly, for graphite, a very stable SEI layer is generated at an initial formation charging stage, and a change in volume of an electrode plate is 20% or less after an initial charging stage, so that the SEI layer tends to be maintained at the initial charging stage as it is without a distinct change. However, in a silicon-based negative active material, a change in volume of an electrode plate is large, so that a phenomenon, in which a surface of a new active material is exposed to an electrolyte while an SEI layer, which is initially generated on a surface of the active material, is separated when the active material is contracted, and a new SEI layer is generated on the surface during next expansion, is repeated, so that a side reaction layer, which is a very thick SEI layer, is developed.

The side reaction layer piled on the surface of the active material serves as a resistor and disturbs a movement of lithium within the secondary battery, and the electrolyte is consumed for forming the side reaction layer, thereby causing a problem in that a lifespan of a battery is decreased. Further, an increase in a thickness of the electrode plate according to the development of the side reaction layer causes physical deformation of a jelly-roll of the battery, and a current is concentrated to a partial area of the electrode plate, thereby causing a phenomenon in that the battery is rapidly degraded.

For a silicon alloy material in the related art, there is a case where a matrix exists within the active material as it is while charge and discharge are repeated, and only a silicon part is contracted and expanded, so that a crack is generated between the matrix and silicon. In this case, it is found that an electrolyte permeates the crack and a side reaction layer of the electrolyte is generated within the active material, so that the active material is dispersed, and in this case, a sharp increase in a thickness of the electrode plate after 50 cycles is observed.

This phenomenon cannot be found during the measurement of the thickness of the electrode plate after one cycle, and implies that even though the silicon-alloy material has an excellent initial expansion rate, when the silicon alloy material is actually applied to a battery, the silicon alloy material may cause various problems, such as an increase in internal resistance within the battery and depletion of the electrolyte. Accordingly, the expansion of the electrode plate after 50 cycles suggested in the present exemplary embodiment is a very useful evaluation index for evaluating expansion, contraction, and side reaction phenomena of the active material when developing a silicon-based negative active material.

In the exemplary embodiment of the present invention, a size of an expansion rate after 50 cycles is investigated according to a composition of a metal compound for a negative active material used in the exemplary embodiment of the present invention to derive a range of an optimum expansion rate according to a change in composition.

In the meantime, in the exemplary embodiment of the present invention, a fine crystalline region exists on a matrix of an alloy, thereby making lithium be more easily dispersed. Further, a rate of the existence of the fine crystalline region may be represented by an amorphization degree, and the amorphous region is formed on the matrix, so that a volume expansion while charging the secondary battery may be restricted.

The present invention is characterized in that an amorphization degree of the fine crystalline region on the matrix is 25% or more. When the amorphization degree is formed within the range, lithium is considerably easily dispersed. Further, it can be seen that an expansion rate after 50 cycles is also excellently exhibited within the aforementioned range of the amorphization degree, and thus, when the aforementioned material is used as a negative active material, volume expansion is restricted during charging.

In the exemplary embodiment of the present invention, an amorphization degree may be 25% or more when an XRD pattern rotation angle of an alloy 2θ is in a range of 20° to 100°. Within the range of the amorphization degree, the volume expansion is restricted, so that electric insulation is generated well.

A calculation of an amorphization degree used in the present invention is as follows, and an amorphization degree may be calculated according to the illustration of FIG. 3.

Amorphization degree (%)=((entire area−crystallization area))÷entire area)

In the exemplary embodiment of the present invention, a large amorphization degree means that there are many fine crystalline regions, and thus, lithium ions are accumulated by a buffering effect in the fine crystalline region during charging, so that it is possible to obtain an effect in that a main factor of a volume expansion is restricted.

Further, in the exemplary embodiment of the present invention, an expansion rate after 50 cycles has a range of 70 to 150%, and a negative active material for a secondary battery formed by an equation below is provided.

$$Si_xTi_yFe_zAl_u \quad (1)$$

(x, y, z, and u are atom % (at %), x: $1-(y+z+u)$, y: 0.09 to 0.14, z: 0.09 to 0.14, and u: larger than 0.01 and less than 0.2)

In the present exemplary embodiment, Si has a range of 60 to 70% and Ti and Fe have a range of 9 to 14% based on at %. However, Al has a range larger than 1% and less than 20%, but, preferably, a range of 5 to 19%.

Ti and Fe included in the alloy is bonded to Si to form an intermetallic compound of $Si_2TiFe$. Accordingly, when a content of each of Ti and Fe is 14 at %, 28 at % or more of Si is consumed for forming the intermetallic compound, so that a capacity of Si per g of the active material is decreased, and in this case, in order to obtain Si with a capacity of 1,000 mAh/g or more, the content of Si inserted needs to be considerably increased.

In general, when a large amount of Si that is a semimetal is contained, viscosity of a molten metal is high during melting, and thus rapid solidification workability becomes poor, so that the content of Si is maintained within a range of 70% as possible as it can, and thus, preferably, the contents of Ti and Fe do not exceed 14%. In the exemplary embodiment of the present invention, it was derived that it is preferable to decrease the contents of Ti and Fe to 14% or less during a process of drawing an optimum alloy component in relation to an expansion rate.

Further, Al may have a range larger than 1% and less than 20% based on at %. When about 1% of Al is included, expansion of the active material is severely incurred after 50 cycles, and the active material is dispersed, so that about 1% of Al is not preferable. Further, when 20% of Al is included, a discharge capacity is decreased by a change in a volume fraction of Si:matrix, so that 20% of Al is not preferable. In the exemplary embodiment of the present invention, it was derived that when Al has a range of 5 to 19% based on at %, the active material has a range of the most preferable expansion rate, and it could be seen that a discharge capacity is not decreased within the range of 5 to 19%. Most preferably, Al is 10 to 19%, and it is possible to obtain the range of a most preferable 50 cycle expansion rate, and further a discharge capacity is not decreased.

Further, a method of preparing the negative active material of the present invention is not particularly limited, and for example, various fine powder preparing methods (a gas atomizer method, a centrifugal gas atomizer method, a plasma atomizer method, a rotating electrode method, and a mechanical alloying method) publicly known in the art may be used as the method. In the present invention, it is possible to prepare an active material by applying, for example, a single roll rapid solidification method of mixing Si and a component forming the matrix, melting a mixture by an arc melting method, and the like, and then spraying the melt to a rotating copper roll. However, a method applied in the present invention is not limited to the aforementioned method, and as long as a method may sufficiently obtain a rapid solidification speed, other than the single roll rapid solidification method, the aforementioned suggested fine powder preparing method (the gas atomizer method, the centrifugal gas atomizer method, the plasma atomizer method, the rotating electrode method, and the mechanical alloying method) may be used.

Further, it is possible to manufacture a secondary battery by using the negative active material according to the exemplary embodiment of the present invention, and the secondary battery may include a lithiated intercalation compound as a positive electrode, and further, inorganic sulfur ($S_8$, elemental sulfur) and a sulfur compound may be used, and examples of the sulfur compound include $Li_2S_n$ ($n \geq 1$), $Li_2S_n$ ($n \geq 1$) melt in catholyte, and an organic sulfur compound or a carbon-sulfur polymer $((C_2S_f)_n, f=2.5$ to $50, n \geq 2)$.

Further, the kind of electrolyte included in the secondary battery of the present invention is not particularly limited, and a general means publicly known in the art is adoptable. In one example of the present invention, the electrolyte may include a nonaqueous organic solvent and lithium salt. The lithium salt is melt in an organic solvent, so that the lithium salt may serve as a lithium ion supply source within the battery, and facilitate a movement of lithium ions between the positive electrode and a negative electrode. Examples of the lithium salt usable in the present invention include one kind or two or more kinds of $LiPF_6$, $LiBF_4$, $LiSbF_6$, $LiAsF_6$, $LiCF_3SO_3$, $LiN(CF_3SO_2)_3$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (here, x and y are natural numbers), LiCl, LiI, and lithium bisoxalate borate as supporting electrolytic salt. A concentration of lithium salt in the electrolyte may be changed depending on a usage, and generally is in a range of 0.1 M to 2.0 M.

Further, the organic solvent serves as a medium for making ions involving in an electrochemical reaction of the battery move, and an example thereof includes one or more of benzene, toluene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, R—CN (here, R is a hydrocarbon group having a linear, branched, or ring structure with 2 to 50 carbon atoms, and the hydrocarbon group may include double bonding, aromatic ring, or ether bonding), dimethylformamide, dimethylacetate, xylene, cyclohexane, tetrahydrofuran, 2-methyltetrahydrofuran, cyclohexanone, ethanol, isopropyl alcohol, dimethyl carbonate, ethyl methyl carbonate, diethyl carbonate, methyl propyl carbonate, propylene carbonate, methyl propionate, ethyl propionate, methyl acetate, ethyl acetate, propyl acetate, dimethoxyethane, 1,3-dioxolane, diglyme, tetraglyme, ethylene carbonate, propylene carbonate, γ-butyrolactone, sulfolane, valerolactone, decanolide, and mevalerolactone, but is not limited thereto.

The secondary battery of the present invention may further include a typical element, such as a separator, a can, a battery case, or a gasket, in addition to the aforementioned elements, and a particular kind of the element is not particularly limited. Further, the secondary battery of the present invention may include the aforementioned elements and be manufactured by a method and in a shape general in the art. An example of the shape of the secondary battery of the present invention includes a cylindrical shape, a horn shape, a coin shape, or a pouch shape, but the shape thereof is not limited thereto.

Example 1

The present invention will be described in more detail through the Examples.

In the present Example, Si has a range of 60 to 70% based on at %, and Ti and Fe have a range of 9 to 14% based on at %. In the meantime, the Al has a range larger than 1% and less than 20%, and preferably, a range of 5 to 19%. Most preferably, the Al has the range of 10 to 19%.

Table 1 below is a table representing a composition range of the Examples of the present invention and the Comparative Examples. In the meantime, Table 2 below relates to an evaluation of a negative active material based on the compositions of Table 1, and particularly, represents a 1CY-charge/discharge quantity, 1CY-efficiency, a 1CY-electrode plate capacity, a 50CY-discharge capacity, 50CY-efficiency, a 50CY-capacity maintenance rate, a 50CY-expansion rate, and an amorphization degree (%) of the Examples and the Comparative Examples. A technical meaning for each item of Table 2 will be described in detail below.

TABLE 1

| Classification | Si (at %) | Ti (at %) | Fe (at %) | Al (at %) | Si/Ti (Fe) |
|---|---|---|---|---|---|
| Comparative Example 1 | 70 | 15 | 15 | 0 | 4.66 |
| Comparative Example 2 | 70 | 14.5 | 14.5 | 1 | 4.82 |
| Comparative Example 3 | 60 | 10 | 10 | 20 | 6 |
| Example 1 | 70 | 12.5 | 12.5 | 5 | 5.6 |

TABLE 1-continued

| Classification | Si (at %) | Ti (at %) | Fe (at %) | Al (at %) | Si/Ti (Fe) |
|---|---|---|---|---|---|
| Example 2 | 70 | 11.5 | 11.5 | 7 | 6.08 |
| Example 3 | 70 | 10 | 10 | 10 | 7 |
| Example 4 | 68 | 9 | 9 | 14 | 7.5 |
| Example 5 | 65 | 10 | 10 | 15 | 6.5 |
| Example 6 | 70 | 10.5 | 10.5 | 9 | 6.66 |
| Example 7 | 67 | 10 | 10 | 13 | 6.7 |
| Example 8 | 66 | 9.93 | 9.93 | 14.14 | 6.64 |
| Comparative Example 4 | 70 | 7.5 | 7.5 | 15 | 9.3 |
| Comparative Example 5 | 70 | 6.5 | 6.5 | 17 | 10.76 |

In the exemplary embodiment of the present invention, the items were measured by repeating charge/discharge 50 times. The charge/discharge method was performed based on a charge/discharge method for an active material for a lithium secondary battery which is generally and publicly known in the art.

First, in Examples 1 to 8 of the present invention, Al is composed within a range of 5 to 19% based on at %, and Comparative Example 1 represents a case where Al is not added, and Comparative Example 2 represents the case where Al is added by 1%, and Comparative Example 3 represents the case where Al is added by 20%.

In the meantime, Comparative Example 4 represents the case where Al is added by 15% and Ti (Fe) is added by 7.5%, and Comparative Example 5 represents the case where Al is added by 17% and Ti (Fe) is added by 6.5%.

In the meantime, Ti and Fe are bonded to Si to form $Si_2TiFe$ that is an intermetallic compound. Accordingly, when the contents of Ti and Fe are large, Si is consumed for forming the intermetallic compound, so that a capacity of Si per g of an active material is decreased, and in this case, in order to obtain Si with a capacity of 1,000 mAh/g or more, the content of Si inserted needs to be considerably increased. In general, when a large amount of Si that is a semimetal is contained, viscosity of a molten metal is high during melting, and thus rapid solidification workability becomes poor, so that the content of Si is preferably maintained within a range of 70%. Accordingly, it is preferable that the contents of Ti and Fe do not exceed 14% considering the forming of the intermetallic compound with Si.

In the Examples of the present invention, it was derived that it is preferable that the contents of Ti or Fe has a range of 9% to 14% during a process of drawing an optimum alloy component in relation to an expansion rate.

Referring to Tables 1 and 2, in the Examples of the present invention, it was derived that it is preferable that a ratio of Ti to Fe in the negative active material for the secondary battery has 1:1 and a ratio of Si:Ti or Si:Fe in the negative active material for the secondary battery has a range of 5:1 to 9:1.

Further, Al may have a range larger than 1% and less than 20% based on at %. When about 1% of Al is included, expansion of the active material is severely incurred after 50 cycles, and in this case, the active material is dispersed, so that about 1% of Al is not preferable. Further, when 20% of Al is included, a discharge capacity is sharply decreased by a change in a volume fraction of Si:matrix, so that 20% of Al is not preferable. In the Examples of the present invention, it was derived that when Al has a range of 5 to 19% based on at %, the range of the most preferable expansion rate is obtained, and it could be seen that a discharge capacity is not decreased within the range of 5 to 19%. Most preferably, Al is 10 to 19%, and it is possible to obtain the range of a most preferable 50 cycle expansion rate, and further a discharge capacity is not decreased.

Referring to Table 2 below, in Examples 1 to 8 of the present invention, it can be seen that performance of the active material is improved according to the addition of Al. Particularly, it can be seen that when Al is added, a discharge capacity, reversible efficiency, and an expansion characteristic are remarkably improved. By contract, in Comparative Example 1, in which Al is not added, a 50 cycle expansion characteristic has a value exceeding 200%. Further, in Comparative Example 2 in which 1% of Al is added, a 50 cycle expansion characteristic exceeds 200% similar to Comparative Example 1. By contrast, in Comparative Example 3 in which 20% of Al is added, a 50 cycle expansion characteristic exceeds is 40.2%, which is very low, but in this case, a discharge capacity is remarkably decreased, so that there is a problem in that an effect of performance improvement of the negative active material of a secondary battery is rather decreased.

In the meantime, a ratio of Si/Ti(Fe) in Comparative Example 4 having a composition of 15% Al and 7.5% Ti(Fe) has 9.3, and a ratio of Si/Ti(Fe) in Comparative Example 5 having a composition of 17% Al and 6.5% Ti(Fe) has 10.76. Therefore, a 50 cycle expansion characteristic is very low when a composition of Ti(Fe) is less than 9% and a ratio of Si/Ti(Fe) exceeds 9.

Accordingly, in the Examples of the present invention, referring to Tables 1 and 2, it can be seen that a discharge capacity, reversible efficiency, and an expansion characteristic of the negative active material are remarkably improved according to the addition of Al.

Further, it can be seen that when the content of Al exceeds at least 1%, and is less than 20% based on at %, optimum performance is exhibited. Further, it can be seen that in Comparative Examples 1 and 2, an amorphization degree (%) is less than 25%, and a ratio of Si/Ti(Fe) is also less than 5. Thus, it can be seen that in the Examples of the present invention, a preferable ratio of Si:Ti or Si:Fe in the negative active material for the secondary battery has a range of 5:1 to 9:1.

FIGS. 1A, 1B, and 1C and FIG. 2 are tissue pictures showing an expansion rate characteristic after 50 cycles for Comparative Example 2 and Example 5, respectively. In FIGS. 1A, 1B, and 1C, it can be seen that a part forming a bright particle shape is a matrix, and a dark background part is Si, and the matrixes are well collected at an initial stage before a lifespan test similar to FIG. 1C, but bright particles forming the matrix are dispersed while charge/discharge for 50 cycles is repeated and a volume of an Si part is increased. As illustrated in FIG. 1C, even after 50 cycles, the matrixes are not dispersed from each other and are collected well regardless of contraction and expansion of silicon. A phenomenon, in which the active material matrixes are dispersed, cause a rapid increase in an expansion numerical value after 50 cycles. When 1% or less of Al is added similar to Comparative Examples 1 and 2, an expansion rate after 50 cycles is 200% or more, which is very high, by contrast, in Example 5, in which the dispersion of the active material is not observed, it can be seen that an expansion rate after 50 cycles is about 78%, which is very excellent, and a lifespan characteristic is also very excellent.

TABLE 2

| Classification | 1CY-charge | 1CY-discharge | 1CY-efficiency | 1CY-Electrode plate | 50CY-discharge | 50CY-efficiency | 50CY-maintenance | 50CY-expansion | Amorphization degree (%) |
|---|---|---|---|---|---|---|---|---|---|
| Comparative Example 1 | 1134.0 | 924.2 | 81.5% | 800.4 | 871.2 | 98.4% | 101.6% | 210.0% | 24.5 |
| Comparative Example 2 | 1277.2 | 1072.3 | 83.9% | 928.6 | 1012.1 | 98.8% | 96.1% | 208.3% | 24.7 |
| Comparative Example 3 | 614.2 | 432.8 | 70.3% | 374.8 | 597.7 | 100.5% | 164.1% | 40.2% | 46.5 |
| Example 1 | 1299.9 | 1085.2 | 83.5% | 939.8 | 948.7 | 99.1% | 91.8% | 147.9% | 29.2 |
| Example 2 | 1405.6 | 1212.5 | 86.3% | 1050.0 | 1125.1 | 99.5% | 97.1% | 96.2% | 41.1 |
| Example 3 | 1336.5 | 1133.2 | 84.7% | 981.3 | 1038.7 | 99.3% | 97.2% | 120.0% | 45.5 |
| Example 4 | 1752.3 | 1535.8 | 87.6% | 1330.0 | 1216.5 | 99.3% | 88.7% | 93.8% | 35.1 |
| Example 5 | 1189.4 | 988.0 | 83.0% | 855.6 | 977.2 | 100.5% | 113.2% | 78.1% | 45.3 |
| Example 6 | 1608.8 | 1375.2 | 85.5% | | 1245.8 | 99.4% | 98.8% | 110% | 43.1 |
| Example 7 | 1278 | 1062 | 83% | | 1037 | 99.5% | 97.6% | 82.8% | 47.7 |
| Example 8 | 1465 | 1243 | 84.8% | | 1069 | 99.6% | 86.1% | 76.5% | 46.4 |
| Comparative Example 4 | 1822.7 | 1582.6 | 86.8% | | 1311 | 98.9% | 82.9% | 180% | 35.9 |
| Comparative Example 5 | 1892.3 | 1635.1 | 86.4% | | 1236 | 99.1% | 75.6% | 183% | 37.7 |

First, the active material in the Example of the present invention was evaluated by manufacturing an electrode plate having a composition below.

A silicon alloy active material was evaluated by manufacturing an electrode plate having a composition in which a ratio of a conductive addictive (based on a carbon black) and a binder (based on an organic material, a PAI binder) is 86.6%:3.4%:10%, and slurry dispersed in an NMP solvent was prepared, the slurry was coated on a copper foiled current collector by a doctor blade method, followed by drying in a microwave oven at 110° C. and heat treating for one hour at an Ar atmosphere and 210° C., to cure a binder.

The electrode plate manufactured by the aforementioned method was assembled to a coin cell by using a lithium metal as a counter electrode and was subject to the formation process under the condition below.

Charge (lithium insertion): 0.1C, 0.005V, 0.05C cut-off
Discharge (lithium discharge): 0.1C, 1.5V cut-off After the formation process, a cycle test was performed under the condition below.

Charge: 0.5C, 0.01V, 0.05C cut-off
Discharge: 0.5C, 1.0V cut-off

In Table 2, 1CY-charge (mAh/g) is a formation charge capacity per 1 g of an active material, and is a value obtained by measuring a charge quantity at a charge stage in the formation process that is the first charge stage after assembling the coin cell and dividing the measured charge quantity by weight of the active material included in the coin cell electrode plate.

1CY-discharge (mAh/g) is a formation discharge capacity per 1 g of the active material, and is a value obtained by measuring a charge quantity at a discharge stage in the formation process that is the first charging stage after assembling the coin cell and dividing the measured charge quantity by weight of the active material included in the coin cell electrode plate. In the present Example, a capacity per g means a 0.1C deformation discharge capacity that is the discharge capacity measured in this case.

1CY-efficiency is a value, expressed by a percentage, obtained by dividing a discharge capacity in the formation process that is the first charge/discharge process by a charge capacity.

In general, graphite has high initial efficiency of 94%, a silicon alloy has initial efficiency of 80 to 90%, and a silicon oxide (SiOx) has initial efficiency of a maximum of 70%.

Any kind of material has initial efficiency of less than 100% because lithium initially injected while charging during the formation process is irreversibly trapped or consumed by a side reaction, such as formation of an SEI, and when initial efficiency is low, there is a loss in that a negative active material and a positive active material need to be additionally injected, so that it is important to improve initial efficiency when designing a battery.

The silicon alloy used in the Example of the present invention has an initial efficiency value of 85%, and the conductive addictive or the binder initially and irreversibly consumes lithium, so that an initial efficiency value of the active material itself is substantially about 90%.

50CY-discharge is a discharge capacity per g of the active material for 50 cycles, and is a value obtained by dividing a charge quantity measured during the discharge at the $50^{th}$ cycle including the formation process during the cycle test progressed with 0.5C after the formation process by weight of the active material. When the active material deteriorates during the progress of the cycle test, 50CY-discharge is represented by a numerical value smaller than an initial discharge capacity, and when the active material hardly deteriorates during the progress of the cycle test, 50CY-discharge is represented by a numerical value similar to an initial discharge capacity.

50CY-efficiency is a ratio, expressed by a percentage, of a discharge quantity to a charge quantity at the 50 cycle. High 50CY-efficiency means that a loss of lithium by a side reaction and other deterioration at a corresponding cycle is small. In general, when the 50CY-efficiency is 99.5% or more, the value is determined as a very excellent value, and distribution in the assembling of the coin cell cannot be ignorable according to an environment of an experiment room, so that even when the 50CY-efficiency is 98% or more, the value is determined as an excellent value.

50CY-maintenance is a ratio, which is expressed by a percentage, of a discharge capacity at the $50^{th}$ cycle based on a discharge capacity at the first cycle when a next 0.5C cycle is performed except for the cycle performed during the formation process.

When the 50CY-maintenance rate is large, it is considered that an inclination of a battery lifespan close to a horizontal line, and when the 50CY-maintenance rate is 90% or less, it means that deterioration is incurred during the progress of the cycle and a discharge capacity is decreased. In some Examples, there are even the cases where the 50CY-maintenance ratio exceeds 100%, and this is determined as deterioration is hardly incurred for a lifespan, and activated silicon particles are additionally present.

50CY-expansion is a thickness increased value, which is expressed by a percentage, after 50 cycles compared to an initial electrode plate thickness. A method of measuring the 50CY-expansion will be described in detail below.

First, an initial thickness of a current collector is measured.

Then, a thickness of only the active material is calculated by measuring a thickness of an electrode plate, which is cut in a circular shape so as to be assembled with the coin cell, by using a micro meter, and then subtracting the thickness of the current collector from the measured thickness of the electrode plate.

Next, after a 50 cycle test is completed, the coil cell is removed from a dry room, only a negative electrode plate is separated, an electrolyte left on the electrode plate is washed by using a DEC solution and dried, a thickness of the electrode plate is measured by using a micro meter, and a thickness of the current collector is subtracted from the measured thickness of the electrode plate to calculate a thickness of only the active material after the cycle. That is, a value, which is expressed by a percentage, obtained by dividing an increased thickness of the active material after 50 cycles compared to an initial thickness of the active material by the initial thickness of the active material is 50CY-expansion.

It will be appreciated by those skilled in the art that the present invention described above may be implemented into other specific forms without departing from the technical spirit thereof or essential characteristics. Thus, it is to be appreciated that embodiments described above are intended to be illustrative in every sense, and not restrictive. The scope of the present invention is represented by the claims to be described below rather than the detailed description, and it should be interpreted that all the changes or modified forms, which are derived from the meaning of the scope of the claims, the scope of the claims, and the equivalents thereto, are included in the scope of the present invention.

The invention claimed is:

1. A negative active material for a secondary battery, which is an alloy formed by a chemical formula below, and in which a ratio of Ti to Fe in the negative active material for the secondary battery has 1:1 and a ratio, R, of Si:Ti or Si:Fe in the negative active material for the secondary battery has ranges of $5.6:1 \leq R < 7:1$ and $7:1 < R \leq 8.55:1$, wherein an amorphization degree of a fine crystalline region on a matrix within the alloy is 29.2~47.7%, wherein an expansion rate of the negative active material after 50 cycles has a range of 70 to 150%, and wherein Si content is greater than 70 at % and less than 77 at %, and wherein the amorphization degree is expressed as:

amorphization degree (%)=((entire area−crystallization area)÷entire area), and wherein the chemical formula is expressed as:

$Si_xTi_yFe_zAl_u$ (x, y, z, and u are at %, x: 1−(y+z+u), y: 0.09 to 0.125, z: 0.09 to 0.125, and u: 0.05 to 0.15).

2. The negative active material of claim 1, wherein a discharge capacity of the negative active material for the secondary battery after 50 cycles is 90% or more compared to an initial discharge capacity.

3. The negative active material of claim 1, wherein efficiency of the negative active material for the secondary battery after 50 cycles is 98% or more.

4. A secondary battery, comprising:
a negative electrode including a negative active material, wherein the negative active material is an alloy formed by a chemical formula below, and a ratio of Ti to Fe in the negative active material for the secondary battery has 1:1, and a ratio, R, of Si:Ti or Si:Fe in the negative active material for the secondary battery has ranges of $5.6:1 \leq R < 7:1$ and $7:1 < R \leq 8.55:1$, wherein an amorphization degree of a fine crystalline region on a matrix within the alloy is 29.2~47.7%, wherein an expansion rate of the negative active material after 50 cycles has a range of 70 to 150%, and wherein Si content is greater than 70 at % and less than 77 at %;
a positive electrode; and
an electrolyte;
wherein the amorphization degree is expressed as:

amorphization degree (%)=((entire area−crystallization area)÷entire area), and wherein the chemical formula is expressed as:

$Si_xTi_yFe_zAl_u$ (x, y, z, and u are at %, x: 1−(y+z+u), y: 0.09 to 0.125, z: 0.09 to 0.125, and u: 0.05 to 0.15).

5. The secondary battery of claim 4, wherein a discharge capacity of the negative active material for the secondary battery after 50 cycles is 90% or more compared to an initial discharge capacity.

6. The secondary battery of claim 4, wherein efficiency of the negative active material for the secondary battery after 50 cycles is 98% or more.

* * * * *